(12) United States Patent
Ahmed (10) Patent No.: US 10,242,048 B2
(45) Date of Patent: Mar. 26, 2019

(54) DYNAMIC QUESTION FORMULATION TO QUERY DATA SOURCES

(71) Applicant: International Business Machines Corporation, Armonk, NY (US)

(72) Inventor: Mohamed N. Ahmed, Leesburg, VA (US)

(73) Assignee: International Business Machines Corporation, Armonk, NY (US)

(*) Notice: Subject to any disclaimer, the term of this patent is extended or adjusted under 35 U.S.C. 154(b) by 445 days.

(21) Appl. No.: 15/006,387

(22) Filed: Jan. 26, 2016

(65) Prior Publication Data
US 2017/0212895 A1    Jul. 27, 2017

(51) Int. Cl.
*G06F 17/30*    (2006.01)
*G06F 17/27*    (2006.01)

(52) U.S. Cl.
CPC ........ *G06F 17/3043* (2013.01); *G06F 17/278* (2013.01); *G06F 17/2785* (2013.01); *G06F 17/3053* (2013.01); *G06F 17/3064* (2013.01); *G06F 17/30684* (2013.01); *G06F 17/30864* (2013.01)

(58) Field of Classification Search
CPC . G06F 17/3043; G06F 17/278; G06F 17/2785
See application file for complete search history.

(56) References Cited

U.S. PATENT DOCUMENTS

2005/0255439 A1    11/2005  Cody
2011/0252108 A1*   10/2011  Morris .................... H04L 51/32
                                                      709/206
2014/0280087 A1*   9/2014   Isensee ............. G06F 17/30477
                                                      707/723
2015/0120717 A1*   4/2015   Kim .................. G06F 17/30699
                                                      707/727
2015/0149281 A1*   5/2015   Carrotte ............... H04N 21/251
                                                      705/14.54

(Continued)

OTHER PUBLICATIONS

Xu et al., "Automatic Question Generation and Answer Judging: A Q&A Game for Language Learning",MIT Computer Science and Artificial Intelligence Laboratory, USA.

(Continued)

*Primary Examiner* — Loc Tran
(74) *Attorney, Agent, or Firm* — Heslin Rothenberg Farley & Mesiti P.C.

(57) ABSTRACT

A method includes one or more program obtaining a natural language query, where the natural language query is comprised of a first group of terms, converting the natural language query to a machine language query, and executing machine language query on at least one computer resource. The program obtains search results responsive to the machine language query, where the search results include related terms derived from terms in the first group of terms utilizing concept expansion. The program parses the search results by applying a statistical information extraction to the terms in the first group and to the related terms to identify entities and generates at least one additional natural language query by incorporating a portion of the identified entities into the query. The identified entities in the new query are a second group of terms. At least one term in the first group is not in the second group.

16 Claims, 6 Drawing Sheets

(56) References Cited

U.S. PATENT DOCUMENTS

2015/0161230 A1 6/2015 Alkov et al.
2015/0179082 A1 6/2015 Byron et al.
2015/0227520 A1 8/2015 Clark et al.
2015/0243179 A1 8/2015 Zaslavsky et al.

OTHER PUBLICATIONS

Ali et al., "Automatic Question Generation from Sentences", TALN 2010, Montreal, Jul. 19-23, 2010.

* cited by examiner

What are the best restaurants in Reston, VA?
615

Best Restaurants in Reston, VA - TripAdvisor 625
www.tripadvisor.com/Restaurants-g56120-Reston_Fairfax_C... ▼ TripAdvisor ▼
Reserve a table for the best dining in Reston, Fairfax County on TripAdvisor: See
5985 reviews of 140 Reston restaurants and search by cuisine, price, location, ...
Restaurants near Sheraton ... · Restaurants near Westin ... · Late Night Seafood

Best Restaurants in Herndon, VA - TripAdvisor
www.tripadvisor.com/Restaurants-g57521-Herndon_Fairfax... ▼ TripAdvisor ▼
Best Restaurants in Herndon, VA. Also show ... "A go to for a special dinner" 10/
26/2015 ... 10/05/2015. "Best Thai in Reston and Herndon" 09/08/2015. Map.
Restaurants near Staybridge ... · Restaurants near Hyatt House ...

Restaurants in Reston - Yelp
www.yelp.com/c/reston-va-us/restaurants ▼ Yelp ▼
The Best Restaurants in Reston on Yelp. Read about places like: Nomad Grill &
Hookah Bar, Scoop Of The Hill, Bagel Cafe, Waku Chicken, Balaji Cafe, ...

Reston/Herndon Restaurants, Washington DC ... - Zomato
www.zomato.com › United States › Washington DC › Virginia ▼
Restaurants in Reston/Herndon, Reston/Herndon, Washington DC Restaurants ... 333
Springvale Rd, Great Falls, DC 22066 ... Waffle King's Virginia Kitchen.

Best of Reston and Herndon: Dining Guide | Washingtonian
www.washingtonian.com/ dining/dining .. best-of-reston-and-herndon- ... ▼

Extracted 635
Entities:
Reston
Fairfax
Herndon
Virginia
Nomad Grill
Waffle King
Great Falls

Extracted 655
Entities:
Reston 10
Fairfax 8
Herndon 7
Virginia 7
Nomad Grill 5
Waffle King 5
Great Falls 3

Suggested Questions:
What is the Nomad Grill?
What is the Waffle King?
How far is Herndon from Reston?
How far is Great Falls from Reston?
How many restaurants are in Fairfax County?

DYNAMIC QUESTION FORMULATION TO QUERY DATA SOURCES

TECHNICAL FIELD

One or more aspects of the present invention relate to formulating additional inquiries to electronic data sources by automatically generating questions based on an original query and search results from the query.

BACKGROUND

Computer technology utilized to query data sources has been enhanced through the integration and advancement of Natural Language Processing (NPL), Information Retrieval, Machine Learning, and/or Knowledge Representation and Reasoning in querying technologies. However, in the current implementations, querying systems require a user to continuously interact with the system by posing a natural language question(s), and after the system then provides the answer based on the ingested data, analyzing results and ask more questions to get a full understanding regarding the subject of the queries. Relying on this user interaction, a manual process, presents issue as volumes increase and data sources diversify as exploding volume, variety, and velocity of available information may lead to the exclusion of relevant information from consideration.

SUMMARY

Shortcomings of the prior art are overcome and additional advantages are provided through the provision of a method of formulating additional inquiries to electronic data sources based on an initial query and results of the initial query. The method includes, for instance: obtaining, by one or more processor, a natural language query; converting, by the one or more processor, the natural language query to a machine language query and executing machine language query on at least one computer resource; obtaining, by the one or more processor, search results responsive to the machine language query; parsing, by the one or more processor, the search results to identify entities in the search results; and based on the entities identified, generating, by the one or more processor, at least one additional natural language query.

Shortcomings of the prior art are overcome and additional advantages are provided through the provision of a computer program product for formulating additional inquiries to electronic data sources based on an initial query and results of the initial query. The computer program product includes, for instance a computer readable storage medium readable by one or more processor and storing instructions for execution by the one or more processor for performing a method that includes: obtaining, by the one or more processor, a natural language query; converting, by the one or more processor, the natural language query to a machine language query and executing machine language query on at least one computer resource; obtaining, by the one or more processor, search results responsive to the machine language query; parsing, by the one or more processor, the search results to identify entities in the search results; and based on the entities identified, generating, by the one or more processor, at least one additional natural language query.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 6 depicts an example of a graphical user interface utilized of an embodiment of the present invention.

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

In an embodiment of the present invention, one or more program 440 (see, e.g., FIG. 4) executing on at least one processing resource, e.g., processing unit 16 (FIG. 4), automatically generates relevant questions based on an original query and search results based from one or more data source that the one or more program 440 returned from at least one data source, e.g., memory 28 (FIG. 4), based on the original query. In an embodiment of the present invention the one or more program 440 utilizes concept expansion to identify euphemisms, colloquialisms, and/or phrases in the original query that indicate concepts similar to the content of the original query, in order to automatically capture the intent of the search. The one or more program 440 may also extract frequent terms and entities, including names, events, locations, individuals and/or organizations from the search results. In an embodiment of the present invention, the one or more program 440 utilizes the data from the concept expansion based on the query and the terms the one or more program 440 extracted from the search results to automatically formulate additional queries, which comprise relevant questions. By executing these additional queries, the one or more program may gather data that provides a better result to the initial query. This result is a better results because it may be more accurate, relevant, complete, detailed, etc.

In addition to as well as concurrent to expanding the concepts of the original query and/or extracting data from the search results, certain embodiments of the present invention utilize, one or more program 440 may leverage additional data sources to enhance the accuracy of the additional queries. For example, in an embodiment of the present invention, the one or more program 440 may search data sources external to a computer resource executing the one or more program 440, such as relevant live and/or historical social media. In certain embodiments of the present invention, the one or more program 440 performs automated analytics on the aforementioned search results to identify top users, top influencers (e.g., users with the most followers and re-tweets), top tags, and trending terms. The one or more program 440 may extract information from the social media data, including but not limited to, events, locations, individuals and/or organizations are extracted from. The one or more program 440 may create a customized group of additional queries based on each extracted entity.

As will be described in more detail, an embodiment of the present invention includes a method that entails one or more program 440 (see, e.g., FIG. 4) obtaining a natural language query, where the natural language query includes a first group of terms. The one or more program 440 converts the natural language query to a machine language query and executes the machine language query on at least one computer resource. The one or more program 440 obtains search results responsive to the machine language query. The search results include related terms derived from terms in the first group of terms. The one or more program 440 derived the related terms utilizing concept expansion. The one or more program 440 parses the search results by applying a statistical information extraction to the terms in the first group of terms and to the related terms to identify as entities at least one of: a portion of the terms, or a portion of the related terms. The one or more program 440 generates at least one additional natural language query by incorporating a portion of the identified entities into the at least one additional natural language query. The identified entities in the at least one additional natural language query comprise a second group of terms and at least one term in the first group of terms is not in the second group of terms. In an embodiment of the present invention, the at least one computer resource that the one or more program 440 queries is a search engine.

In an embodiment of the present invention, when the one or more program 440 identifies the entities, it identifies relationships between the entities and the natural language query and generates the at least one additional natural language query based on a portion of those relationships.

In an embodiment of the present invention, the one or more program 440 also assigns rankings to the search results based on confidence levels associated with the results. In certain embodiments, the one or more program 440 assigns the confidence levels based on a regression model and the one or more program 440 generates at least one additional natural language query based on the confidence levels.

In some embodiments of the present invention when the one or more program 440 executes the machine language query and parses the search results, the one or more program 440 accesses and obtains data from at least one of: a structured data source, or an unstructured data source.

In an embodiment of the present invention, when the one or more program 440 parses the search results the one or more program 440 utilizes the natural language query to perform an automated search to ingest entries from a structured data source, generates a sentiment measure for each ingested entry, and extracts trending terms to identify the entities. In an embodiment of the present invention, the structured data source includes social media. In an embodiment of the present invention, the one or more program 440 generates at least one additional natural language query based on the trending terms and the sentiment measures.

As will be understood by one of skill in the art, aspects of the present invention, including automatically generating questions based on an original query and search results from the query, can be integrated into various open domain question/answer (QA) solutions or search engines, including but not limited to, IBM Watson®, a product of International Business Machines Corporation. IBM Watson® is a registered trademark of International Business Machines Corporation, Armonk, N.Y., US.

Aspects of certain embodiments of the present invention improve present computing technology by improving NPL processing such that a query from a client will result in a more accurate set of results and/or follow up questions, without requiring human interaction to achieve this result. Improving NPL processing by a computer system is an issue that is unique to computer technology. By utilizing the vast resources available in computer systems, a user can locate information quickly, especially since computer systems are often externally connected to resources such as additional servers accessible via various network connections, including connections to the Internet. Improving NPL processing, and therefor the ability of a user to utilize computer resources, constitutes an improvement to computer technology. Presently, receiving a result natural language query can often be a human-intensive process as not only must the individual formulate the query, the individual must then synthesize the results and ask follow up questions to assist the computer system in obtaining the information sought by the user. Unfortunately, the mental abilities of human do not scale, especially when querying resources in complex multi-user environments. By automatically generating relevant questions based on an original query, embodiments of the present invention improve existing computer technology in a manner that unlike the aforementioned human interaction, is scalable and sustainable, regardless of the complexity of the computer system and the number of resources of the system.

As will be discussed in greater detail, an advantage of certain embodiments of the present invention is that these embodiments represent enhancements to existing search engines by enabling a user to obtain search results based on information in both structured and unstructured sources. An example of a structured source utilized by embodiments of the present invention is social media.

Advantages of certain embodiments of the present invention may be realized in multi-user and multi-entity computing environments. As computing models become more complex and a given architecture is serviced by more providers, in a multi-faceted environment, the ability to effectively execute a query, including but not limited to a natural language query, and obtain an accurate result that reflects that evidences an appreciation for the content and the sentiment of the original question, becomes more challenging. When the computer system responsible for responding to the query, with accurate search results, is a node of a cloud computing environment, the breadth of resources available to one or more processor executing program code to process and execute the query is greatly expanded. The improvements to NPL processing offered by embodiments of the present invention are realized in this type of environment as the scalable solution presented is improved by the ability of the one or more processor executing the program code to include data from this breadth of resources available in its processing and therefore, ultimately provide a user with an improved (more accurate) answer to a query.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
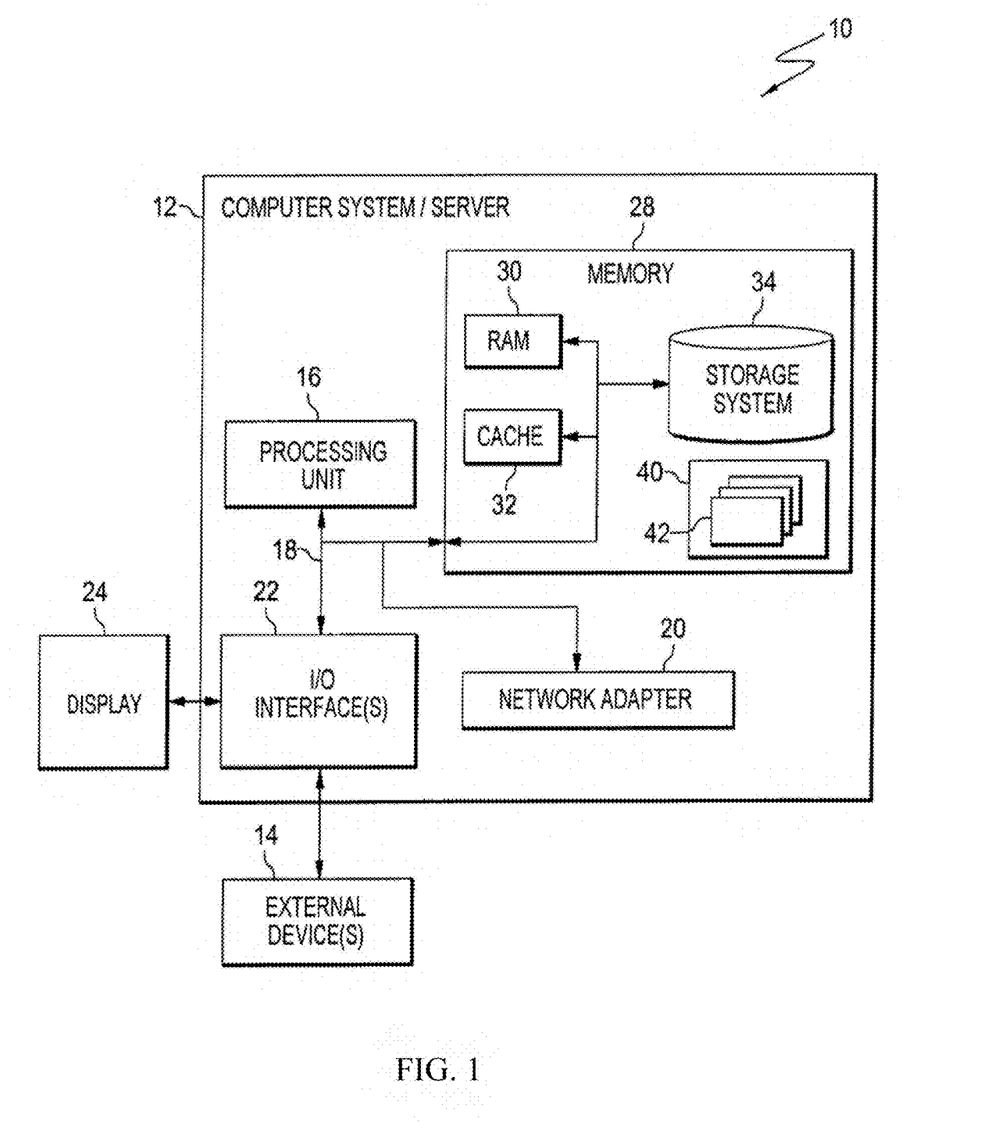
FIG. 1 depicts a cloud computing node, in accordance with one or more aspects set forth herein.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
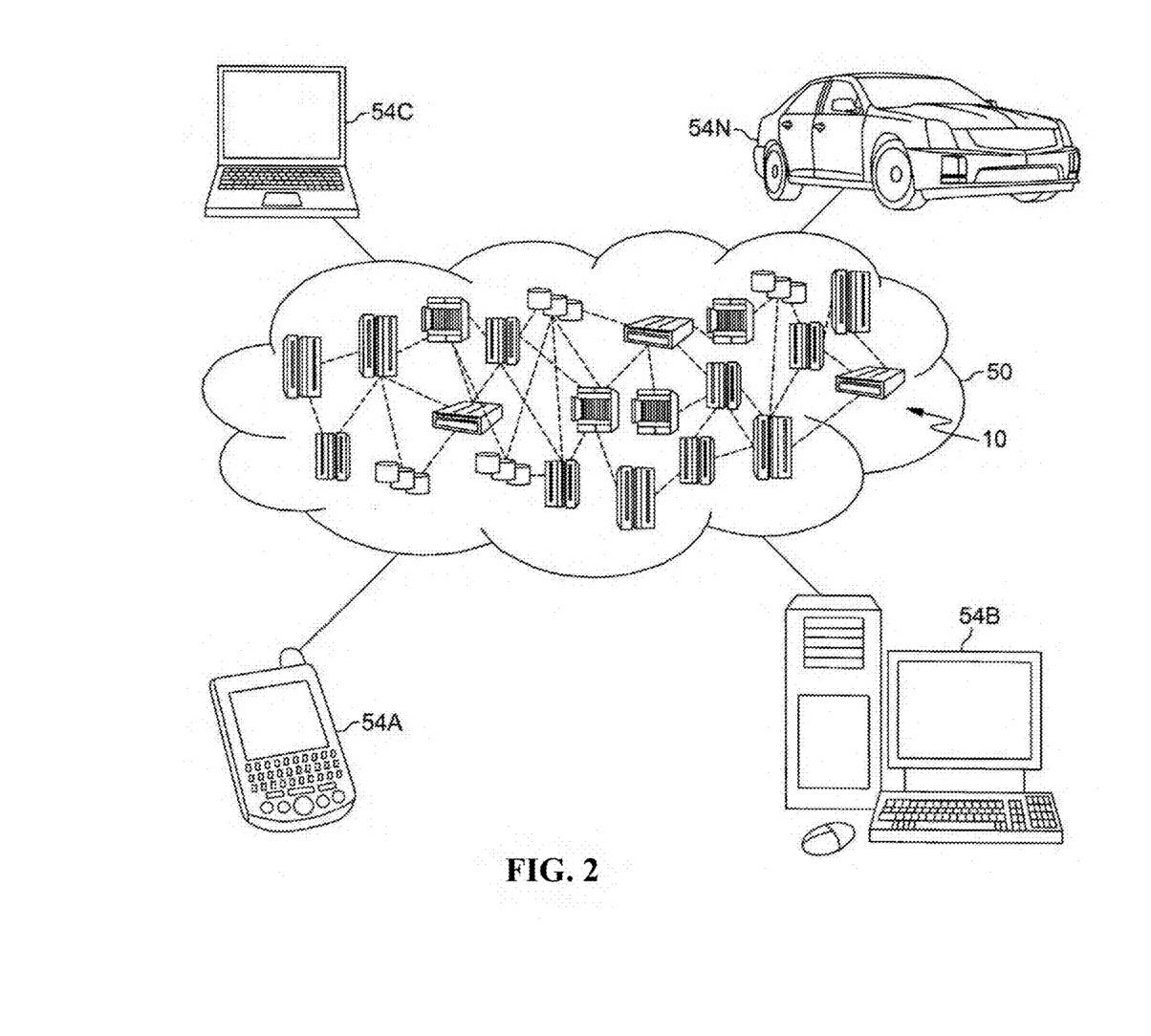
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
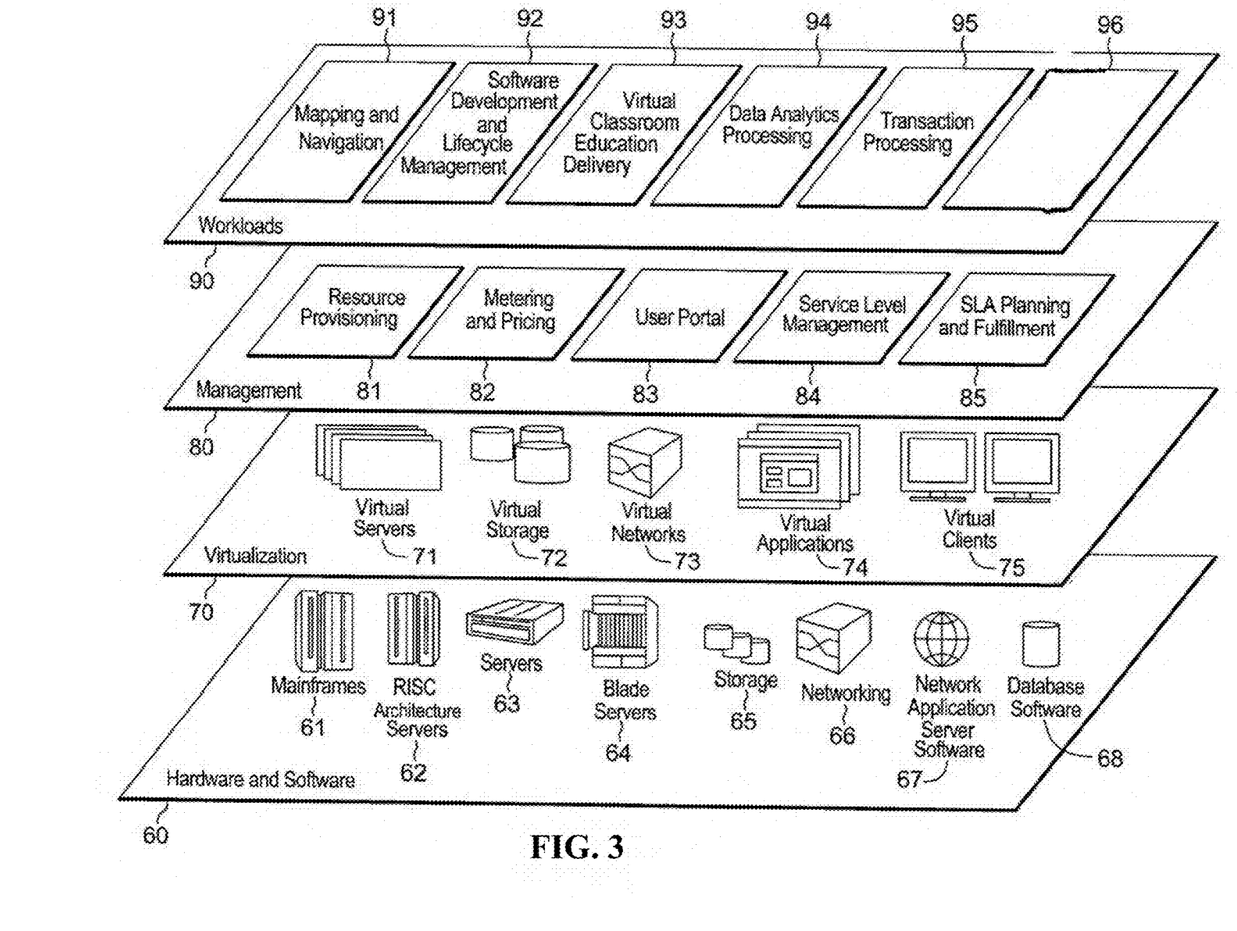
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and formulating additional inquiries to electronic data sources by automatically generating questions based on an original query and search results from the query 96, as described herein. Element 96 can be understood as one or more program 440 described in FIG. 4.

Figure 4:
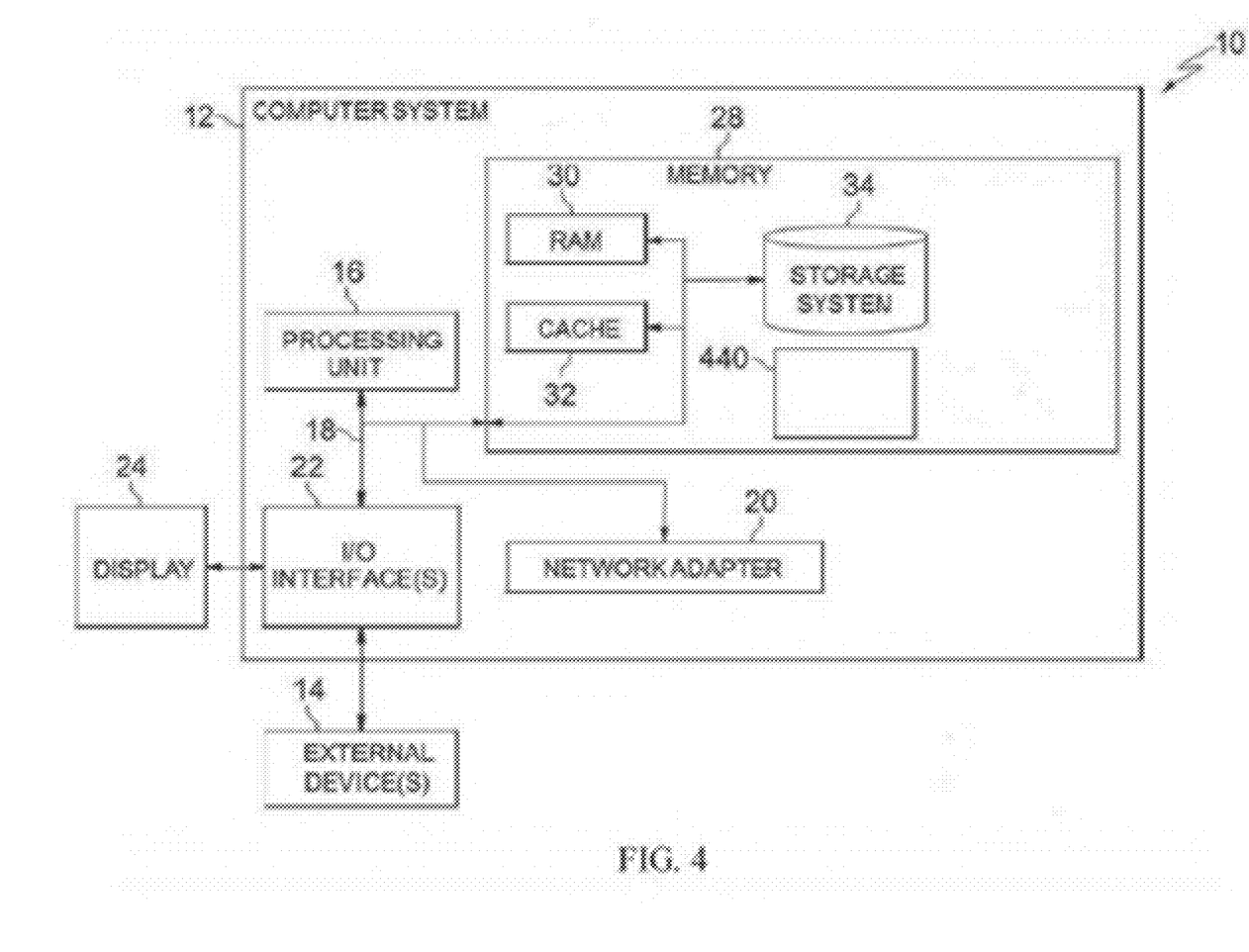
FIG. 4 depicts a hardware overview of a computing node, in accordance with one or more aspects of the present invention.

FIG. 4 depicts a hardware overview of a computing node 10, in accordance with one or more aspects set forth herein.

Program/utility 40 as set forth in FIG. 1 can include one or more program 440 as set forth in FIG. 4, and program/utility 40, including, for example one or more program 440 to evaluate the efficacy of the communications between one or more entities when transferring task ownership between these entities, as described in work layer 96. Program/utility 40 as set forth in FIG. 1 can optionally include additional programs.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
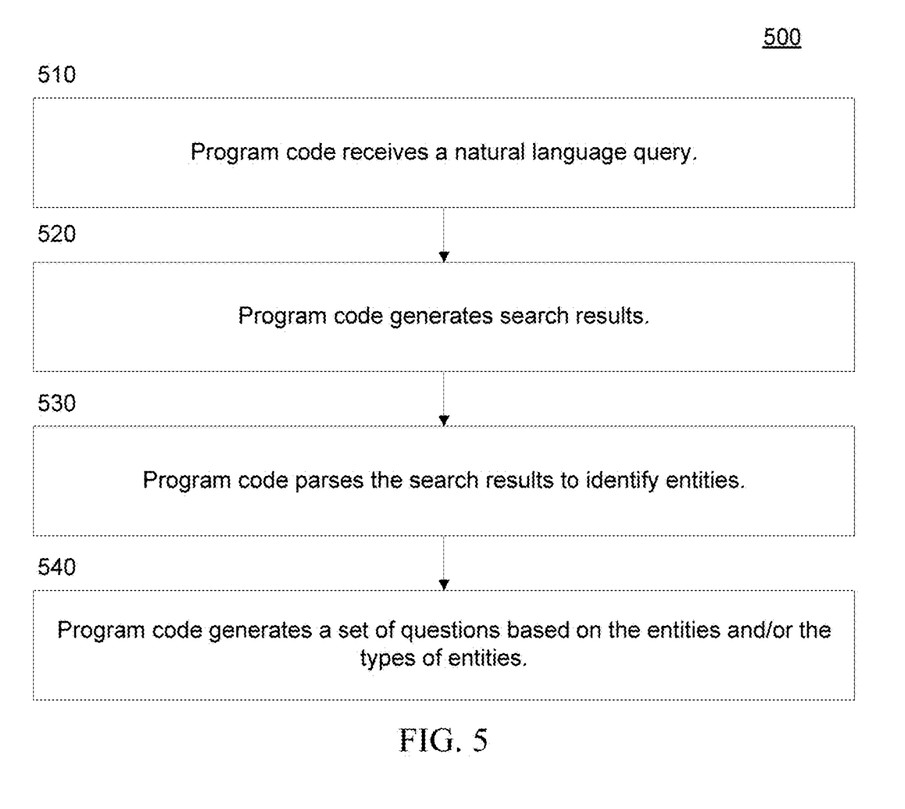
FIG. 5 depicts a workflow that illustrates aspects of an embodiment of the present invention.

FIG. 5 is a workflow 500 that illustrates certain aspects of an embodiment of the present invention. In an embodiment of the present invention, one or more program 440 receives a natural language query (510). The one or more program 440 may comprise a search engine. For example, the one or more program 440 may receive a natural language question, such as "What are the best restaurants in Springfield, New Jersey?"

Based on the natural language query, the one or more program 440 generates search results (520). In an embodiment of the present invention, the one or more program 440 may assign rankings to the search results. In an embodiment of the present invention, the rankings are commensurate with confidence levels with the results. The one or more program 440 may base the confidence level of a given result on a regression model. For example, when utilizing IBM Watson® in an embodiment of the present invention, the one or more program 440 determines the confidence level for the results based on a regression model called the Game State Evaluator. For example, one or more program 440 may generate search results in response to the question, "What are the best restaurants in Springfield, New Jersey?" To extend this example, which is offered merely as an illustration and does not presume or define any limitations, the search results may include mentions of a Location X, an Organization Y, and an Event X in the results.

Returning to FIG. 5, in an embodiment of the present invention, the one or more program 440 parses the search results to identify entities (530). Entities that the one or more program 440 may identify include, but are not limited to people, proper names, locations, organizations, events, etc. In the example of the search results including Location X, an Organization Y, and an Event X, the one or more program 440 can identify these entities by parsing the search results. In an embodiment of the present invention, the one or more program 440 may utilize a statistical information extraction technique to identify these entities. The one or more program 440 may compare terms in the search results to a list of known entities on a computer resource, such as a memory 28 (FIG. 4). For example, a memory 28 that the one or more program 440 accesses when parsing the search results may include Location X, Organization Y, and Event X, enabling the one or more program 440 to identify these entities in the search results.

In an embodiment of the present invention, the one or more program 440, accesses both structured and unstructured data sources to search results and identify entities. For example, in an embodiment of the present invention, the one or more program 440 utilizes the natural language query to perform automated searches to ingest data from structured sources, including but not limited to, social media. In an embodiment of the present invention, the one or more program 440 generates a sentiment measure for each ingested entry and extracts trending terms are extracted to identify entities.

In an embodiment of the present invention, once the one more or program 440 has identified entities in the search results, the one or more program 440 generates (e.g., automatically) a set of questions that are based on the entities and/or the types of entities (540). In an embodiment of the present invention, the one or more program 440 identifies relationships between the entities and/or the types of entities and the natural language query, and the one or more program 440 generates the questions based on the relationships. Returning to the above example, based on the natural language query "What are the best restaurants in Springfield, New Jersey," the search results the one or more program 440 returned included the entities Location X, Organization Y, and Event X, which the one or more program 440 identified when it parsed the search results. In this example, the one or more program 440 may generate a set of questions that includes, for Location X, "How many restaurants are at location X?" Based on the original query, Location X may be Springfield. Based on identifying Organization Y, the one or more program 440 may generate questions, including but not limited to, "What is the revenue of organization Y," and/or, "Who is the CEO of Y?" Based on identifying Organization Y, the one or more program 440 may generate the question "What is the effect of weather on Event X?"

In an embodiment of the present invention where the one or more program 440, accesses both structured data sources, including but not limited to, social media. In this embodiment, the one or more program 440 also identifies entities that the one or more program 440 utilizes in generating questions. Because the one or more program 440 generates a sentiment measure for each ingested entry and extracts trending terms are extracted to identify entities, the one or more program may generate questions based on these sentiments and trends, including but not limited to, "What is the sentiment around Event X," or "Who is Person Z?"

In an embodiment of the present invention, the one or more program 440 may characterize the entities it identifies and generate more or fewer questions based on the characterization. For example, in an embodiment of the present invention, the one or more program 440 may rank the entities based on frequency of appearance in the search results.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 6 is an illustration of certain aspects of certain embodiments of the present invention. As explained above, one or more program 440 receives a natural language query 615 (510). In this example, the one or more program 440 displays natural language query 615 in an upper portion of a graphical user interface (GUI) 600. The one or more program 440 generates search results 625 (520). As seen in FIG. 2, the one or more program 440 may display these results 625 to a user in a GUI, an example of which is reproduced on the left side of the figure. The one or more program 440 parses the search results to identify entities 635 (530). The one or more program 440 may display the entities 635 identified in the GUI, as seen in FIG. 6, to the right of the search results 625. The one or more program 440 generates (e.g., automatically) a set of questions 645 that are based on the entities and/or the types of entities (540). As aforementioned, the one or more program 440 may also determine statistics 655 related to the entities based, for example, on the frequency with which an entity appears in the search results 625. The one or more program 440 may also display these statistic 655 in a GUI.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   obtaining, by one or more processor, a natural language query, wherein the natural language query is comprised of a first group of terms;
   converting, by the one or more processor, the natural language query to a machine language query and executing the machine language query on at least one computer resource;
   obtaining, by the one or more processor, search results responsive to the machine language query, wherein the search results comprise related terms derived from terms in the first group of terms, wherein one or more processor derived the related terms utilizing concept expansion;
   parsing, by the one or more processor, the search results by applying a statistical information extraction to the terms in the first group of terms and to the related terms to identify as entities at least one of: a portion of the terms, or a portion of the related terms, wherein the parsing comprises:
   utilizing, by the one or more processor, the natural language query to perform an automated search to ingest entries from a structured data source;
   generating, by the one or more processor, a sentiment measure for each ingested entry; and extracting, by the one or more processor, trending terms to identify the entities; and
   generating, by the one or more processor, at least one additional natural language query by incorporating a portion of the identified entities into the at least one additional natural language query, wherein the identified entities in the at least one additional natural language query comprise a second group of terms, and wherein at least one term in the second group of terms is not in the first group of terms, wherein the generating further comprises generating some of the at least one additional natural language query based on the trending terms and the sentiment measures.

2. The method of claim 1, wherein the generating comprises:
   identifying, by the one or more processor, relationships between the entities and the natural language query; and
   generating the at least one additional natural language query based on a portion of the relationships.

3. The method of claim 1, wherein the at least one computer resource comprises a search engine.

4. The method of claim 1, further comprising:
   assigning, by the one or more processor, rankings to the search results, wherein the rankings are based on confidence levels associated with the results.

5. The method of claim 4, wherein the assigning is based on a regression model and the generating the at least one additional natural language query is based on the confidence levels.

6. The method of claim 1, wherein the executing machine language query and the parsing the search results comprise accessing and obtaining data from at least one of: a structured data source, or an unstructured data source.

7. The method of claim 1, wherein the structured data source comprises social media.

8. A computer program product comprising:
   a non-transitory computer readable storage medium readable by one or more processor and storing instructions for execution by the one or more processor for performing a method comprising:
   obtaining, by one or more processor, a natural language query, wherein the natural language query is comprised of a first group of terms; converting, by the one or more processor, the natural language query to a machine language query and executing the machine language query on at least one computer resource;
   obtaining, by the one or more processor, search results responsive to the machine language query, wherein the search results comprise related terms derived from terms in the first group of terms, wherein one or more processor derived the related terms utilizing concept expansion;
   parsing, by the one or more processor, the search results by applying a statistical information extraction to the terms in the first group of terms and to the related terms to identify as entities at least one of: a portion of the terms, or a portion of the related terms, wherein the parsing comprises:

utilizing, by the one or more processor, the natural language query to perform an automated search to ingest entries from a structured data source;

generating, by the one or more processor, a sentiment measure for each ingested entry; and extracting, by the one or more processor, trending terms to identify the entities;

and generating, by the one or more processor, at least one additional natural language query by incorporating a portion of the identified entities into the at least one additional natural language query, wherein the identified entities in the at least one additional natural language query comprise a second group of terms, and wherein at least one term in the second group of terms is not in the first group terms, wherein the generating further comprises generating some of the at least one additional natural language query based on the trending terms and the sentiment measures.

9. The computer program product of claim 8, wherein the generating comprises:

identifying, by the one or more processor, relationships between the entities and the natural language query; and generating the at least one additional natural language query based on a portion of the relationships.

10. The computer program product of claim 8, wherein the at least one computer resource comprises a search engine.

11. The computer program product of claim 8, the method further comprising:

assigning, by the one or more processor, rankings to the search results, wherein the rankings are based on confidence levels associated with the results.

12. The computer program product of claim 11, wherein the assigning is based on a regression model and the generating the at least one additional natural language query is based on the confidence levels.

13. The computer program product of claim 8, wherein the executing machine language query and the parsing the search results comprise accessing and obtaining data from at least one of: a structured data source, or an unstructured data source.

14. A system comprising: a memory; one or more processor in communication with the memory; and program instructions executable by the one or more processor via the memory to perform a method, the method comprising:

obtaining, by one or more processor, a natural language query, wherein the natural language query is comprised of a first group of terms; converting, by the one or more processor, the natural language query to a machine language query and executing the machine language query on at least one computer resource;

obtaining, by the one or more processor, search results responsive to the machine language query, wherein the search results comprise related terms derived from terms in the first group of terms, wherein one or more processor derived the related terms utilizing concept expansion;

parsing, by the one or more processor, the search results by applying a statistical information extraction to the terms in the first group of terms and to the related terms to identify as entities at least one of: a portion of the terms, or a portion of the related terms, wherein the parsing comprises:

utilizing, by the one or more processor, the natural language query to perform an automated search to ingest entries from a structured data source; generating, by the one or more processor, a sentiment measure for each ingested entry; and extracting, by the one or more processor, trending terms to identify the entities;

and generating, by the one or more processor, at least one additional natural language query by incorporating a portion of the identified entities into the at least one additional natural language query, wherein the identified entities in the at least one additional natural language query comprise a second group of terms, and wherein at least one term in the second group of terms is not in the first group of terms, wherein the generating further comprises generating some of the at least one additional natural language query based on the trending terms and the sentiment measures.

15. The system of claim 14, wherein the generating comprises:

identifying, by the one or more processor, relationships between the entities and the natural language query; and generating the at least one additional natural language query based on a portion of the relationships.

16. The system of claim 14, the method further comprising:

assigning, by the one or more processor, rankings to the search results, wherein the rankings are based on confidence levels associated with the results.

* * * * *